United States Patent
Lu et al.

(10) Patent No.: US 10,866,384 B2
(45) Date of Patent: Dec. 15, 2020

(54) LENS ASSEMBLY DRIVING APPARATUS, PHOTOGRAPHING MODULE AND ELECTRONIC DEVICE

(71) Applicant: LARGAN DIGITAL CO., LTD., Taichung (TW)

(72) Inventors: Chun-Yi Lu, Taichung (TW); Te-Sheng Tseng, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 157 days.

(21) Appl. No.: 16/051,717

(22) Filed: Aug. 1, 2018

(65) Prior Publication Data

US 2019/0235201 A1    Aug. 1, 2019

(30) Foreign Application Priority Data

Jan. 26, 2018   (TW) .............................. 107102982 A

(51) Int. Cl.
  *G02B 7/09*   (2006.01)
  *G03B 13/36*  (2006.01)
  *H02K 41/035* (2006.01)
  *G03B 3/10*   (2006.01)

(52) U.S. Cl.
  CPC ............... *G02B 7/09* (2013.01); *G03B 3/10* (2013.01); *G03B 13/36* (2013.01); *H02K 41/0356* (2013.01); *G03B 2205/0069* (2013.01)

(58) Field of Classification Search
  CPC ....... G02B 7/09; H02K 41/0356; G03B 13/36
  See application file for complete search history.

(56) References Cited

U.S. PATENT DOCUMENTS

| | | |
|---|---|---|
| 7,808,730 B2 | 10/2010 | Yoon |
| 8,638,510 B2 | 1/2014 | Lee et al. |
| 9,019,624 B2 | 4/2015 | Park et al. |
| 9,250,414 B2 | 2/2016 | Park et al. |
| 9,618,722 B2 | 4/2017 | Park et al. |
| 2017/0023764 A1 | 1/2017 | Chou |
| 2017/0146771 A1 | 5/2017 | Ho et al. |
| 2017/0299839 A1 | 10/2017 | Weng et al. |

FOREIGN PATENT DOCUMENTS

TW   M509915 U   10/2015

*Primary Examiner* — Jack Dinh
(74) *Attorney, Agent, or Firm* — McClure, Qualey & Rodack, LLP

(57) ABSTRACT

A lens assembly driving apparatus includes a holder, a metal yoke, a carrier, a lens assembly, a magnet set, a coil and at least one elastic element. The metal yoke is coupled with the holder. The carrier is movably disposed in the metal yoke. The carrier includes an object-side portion and at least three inner surfaces. The object-side portion has an object-side central hole. The lens assembly has an optical axis. The optical axis is corresponding to the object-side central hole. The lens assembly is coupled in the carrier. A movement of the lens assembly relative to the holder is according to a movement of the carrier. The magnet set includes only two magnets. The coil surrounds and is fixed at an exterior of the carrier. The elastic element is coupled with the carrier and the holder.

10 Claims, 17 Drawing Sheets

LENS ASSEMBLY DRIVING APPARATUS, PHOTOGRAPHING MODULE AND ELECTRONIC DEVICE

RELATED APPLICATIONS

This application claims priority to Taiwan Application Serial Number 107102982, filed Jan. 26, 2018, which is herein incorporated by reference.

BACKGROUND

Technical Field

The present disclosure relates to a lens assembly driving apparatus and a photographing module. More particularly, the present disclosure relates to a lens assembly driving apparatus and a photographing module applicable to a portable electronic device.

Description of Related Art

With the popularity of personal electronic products and mobile communication products having camera functionalities, such as smart phones and tablet personal computers, the demand for compact electronic devices with high resolution and high image quality also increases significantly.

Nowadays, a lens assembly employed in an electronic device normally adopts a voice coil motor (VCM) as a driving apparatus for providing autofocus function. With an electromagnetic force generated by the interaction of magnets and a coil, and with the degree of freedom and the restoring force provided by springs which are required by the movement of the carrier carrying the lens assembly, the carrier is driven by the voice coil motor to bring the lens assembly to move along a direction parallel to an optical axis, so that the autofocus functionality of the lens assembly can be achieved.

However, a conventional driving apparatus usually adopts a single annular magnet, which has a drawback of uneven distribution of magnetic flux. Moreover, when assembling the annular magnet and a metal yoke, the assembling position may be affected by the magnet force due to the dimensional tolerance. As a result, the assembling position is unstable.

Therefore, how to improve the evenness of the magnetic flux distribution and assembling precision of the driving apparatus so as to enhance the autofocus function of the lens assembly, and how to reduce the volume of the driving apparatus so as to accord with the compact trend of current electronic devices, have been the goal of the related industries.

SUMMARY

According to one aspect of the present disclosure, a lens assembly driving apparatus includes a holder, a metal yoke, a carrier, a lens assembly, a magnet set, a coil and at least one elastic element. The holder has an opening. The metal yoke is coupled with the holder, and the metal yoke has a through hole. The carrier is movably disposed in the metal yoke. The carrier includes an object-side portion and at least three inner surfaces. The object-side portion has an object-side central hole. Each of the inner surfaces has a diameter. The diameters of the inner surfaces are different from each other. Each of the diameters of the inner surfaces is greater than a diameter of the object-side central hole. The lens assembly has an optical axis. The optical axis is corresponding to the object-side central hole. The lens assembly includes at least three lens elements. Each of the lens elements has an outer diameter. The outer diameters of the lens elements are different from each other. The lens assembly is coupled in the carrier, and a movement of the lens assembly relative to the holder is according to a movement of the carrier. The magnet set includes only two magnets. The two magnets are opposite to each other and are fixed inside the metal yoke. Each of the two magnets includes a concave arc structure. The coil surrounds and is fixed at an exterior of the carrier. The coil is corresponding to the two magnets. The elastic element is coupled with the carrier and the holder. The concave arc structure of each of the two magnets has a concave arc center. In each of the two magnets, when an included angle between two connecting lines of two ends of the concave arc structure and the concave arc center is θ, the following condition is satisfied:

$$95 \text{ degrees} < \theta < 175 \text{ degrees}.$$

According to another aspect of the present disclosure, a photographing module includes the lens assembly driving apparatus according to the aforementioned aspect.

According to further another aspect of the present disclosure, an electronic device includes the photographing module according to the aforementioned aspect.

According to yet another aspect of the present disclosure, a lens assembly driving apparatus includes a holder, a metal yoke, a carrier, a lens assembly, a magnet set, a coil and at least one elastic element. The holder has an opening. The metal yoke is coupled with the holder, and the metal yoke has a through hole. A side wall of the metal yoke includes at least one plane structure and at least one convex curved structure. The carrier is movably disposed in the metal yoke and includes an object-side portion. The object-side portion has an object-side central hole. The lens assembly has an optical axis. The optical axis is corresponding to the object-side central hole. The lens assembly includes at least three lens elements. Each of the lens elements has an outer diameter. The outer diameters of the lens elements are different from each other. The lens assembly is coupled in the carrier, and a movement of the lens assembly relative to the holder is according to a movement of the carrier. The magnet set includes a plurality of magnets. The magnets are corresponding to each other and are fixed inside the metal yoke. Each of the magnets includes a concave arc structure. The coil surrounds and is fixed at an exterior of the carrier. The coil is corresponding to the magnets. The elastic element is coupled with the carrier and the holder. The lens assembly driving apparatus is a non-threaded driving apparatus. When a total number of the plane structure and the convex curved structure is N, the following condition is satisfied:

$$3 < N < 7.$$

BRIEF DESCRIPTION OF THE DRAWINGS

The present disclosure can be more fully understood by reading the following detailed description of the embodiments, with reference made to the accompanying drawings as follows.

DETAILED DESCRIPTION

1st Embodiment

Figure 1A:
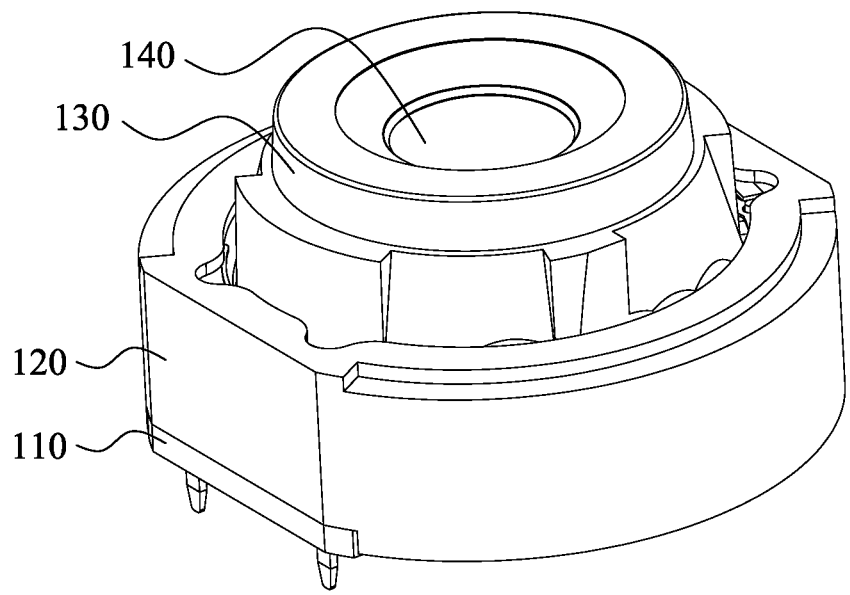
FIG. 1A is a three-dimensional view of a lens assembly driving apparatus according to the 1st embodiment of the present disclosure.
Figure 1B:
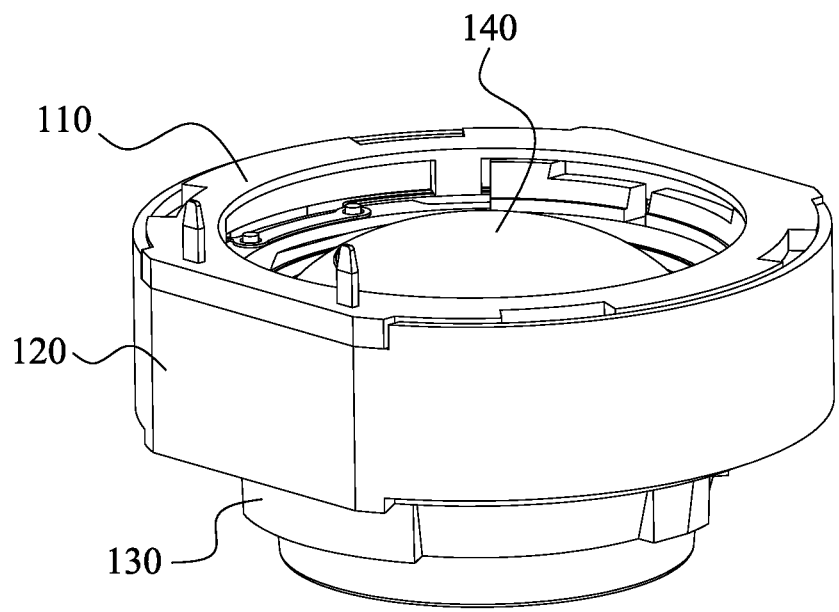
FIG. 1B is another three-dimensional view of the lens assembly driving apparatus in FIG. 1A.
Figure 1C:
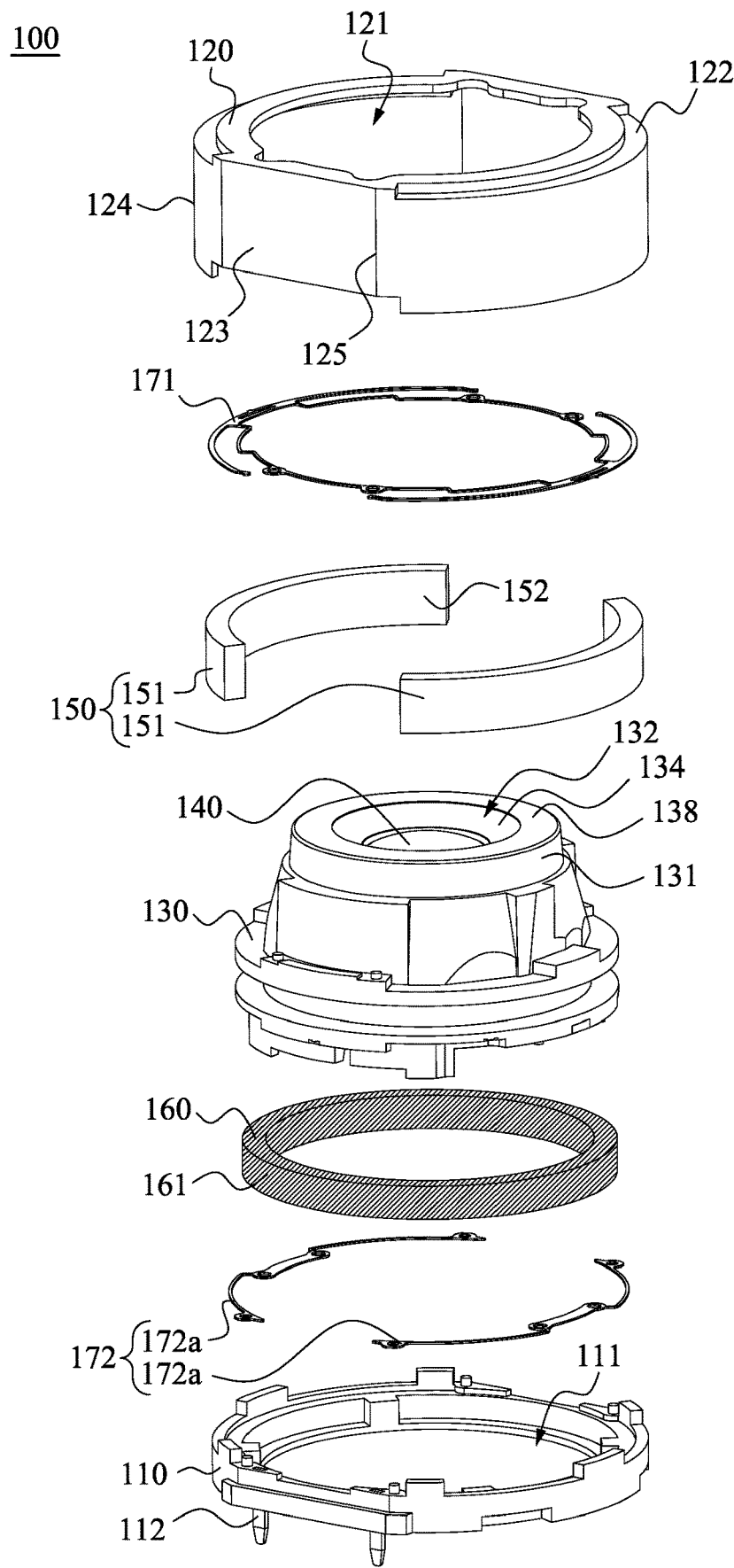
FIG. 1C is an exploded view of the lens assembly driving apparatus in FIG. 1A.
Figure 1D:
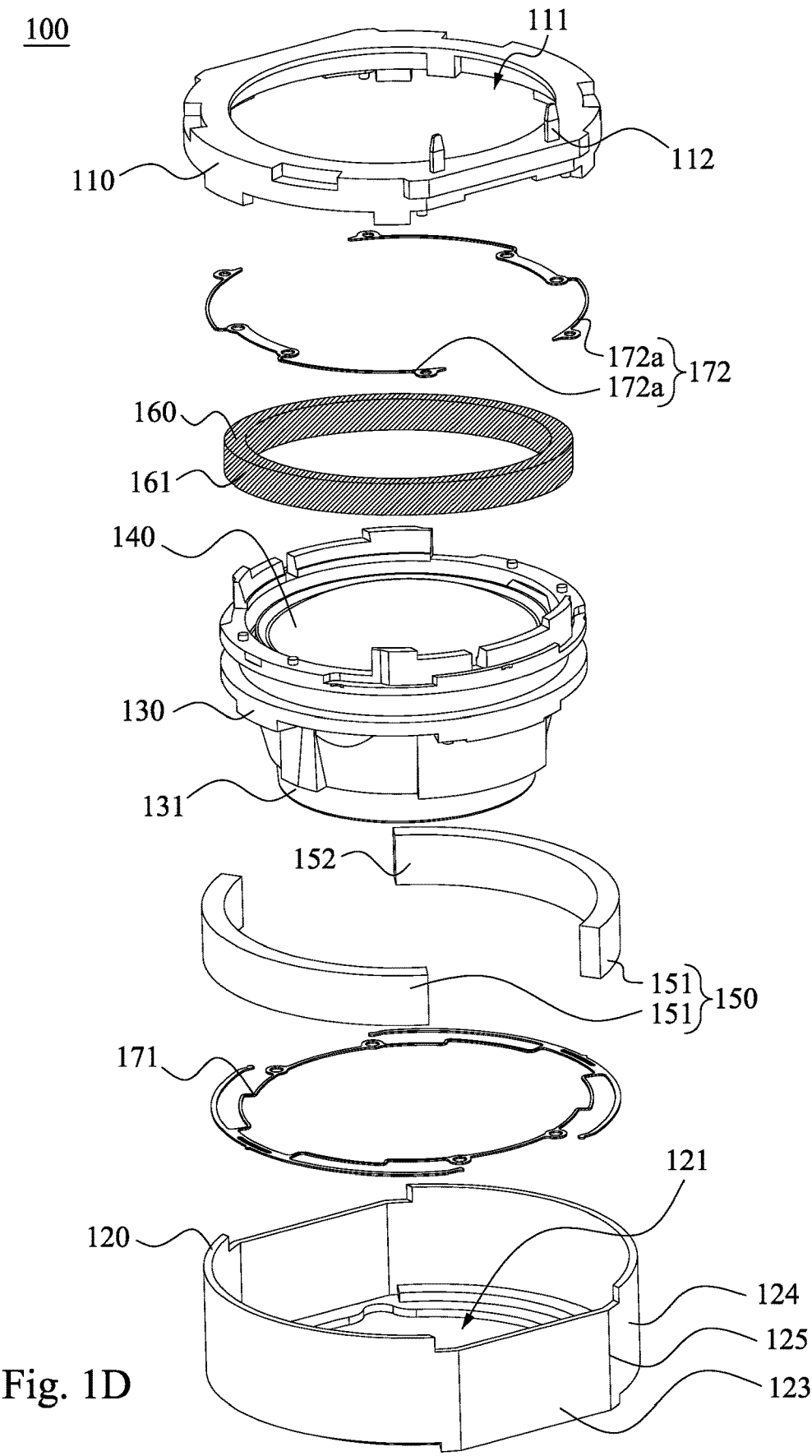
FIG. 1D is another exploded view of the lens assembly driving apparatus in FIG. 1A.
Figure 1E:
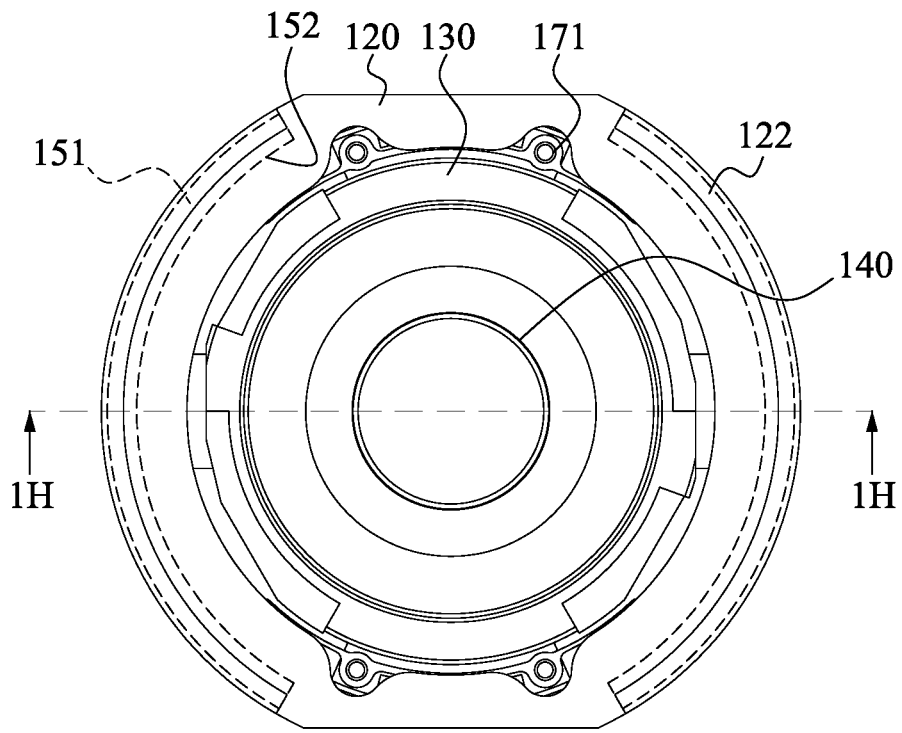
FIG. 1E is a top view of the lens assembly driving apparatus in FIG. 1A.
Figure 1F:
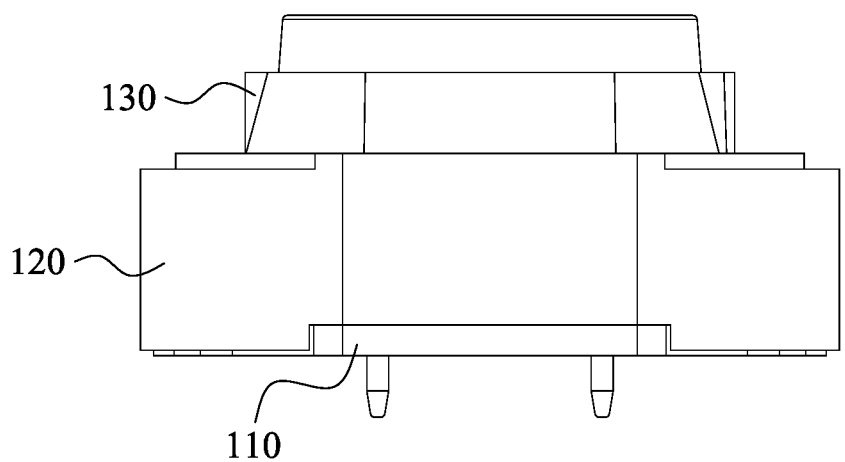
FIG. 1F is a side view of the lens assembly driving apparatus in FIG. 1A.
Figure 1G:
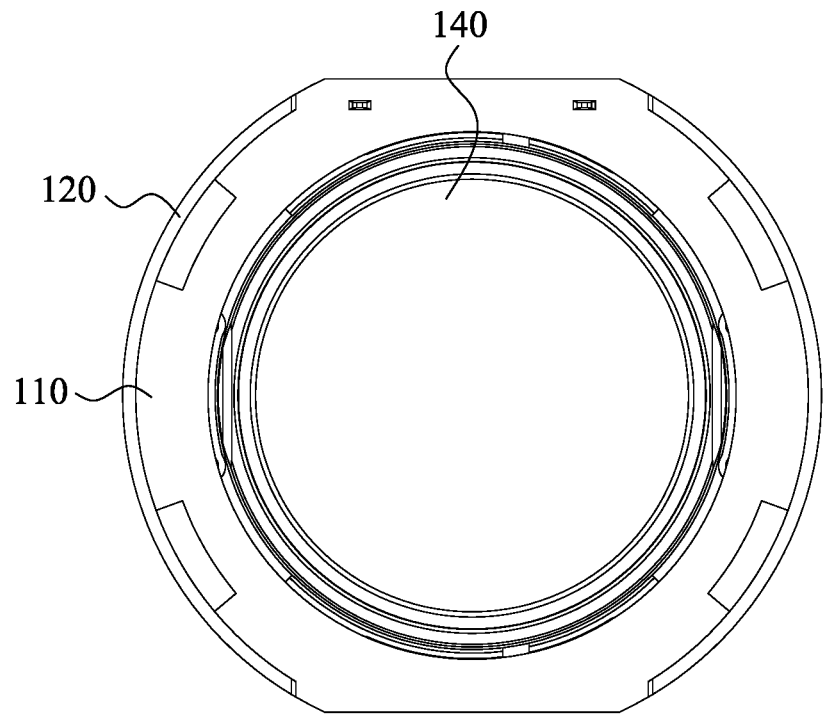
FIG. 1G is a bottom view of the lens assembly driving apparatus in FIG. 1A.
Figure 1H:
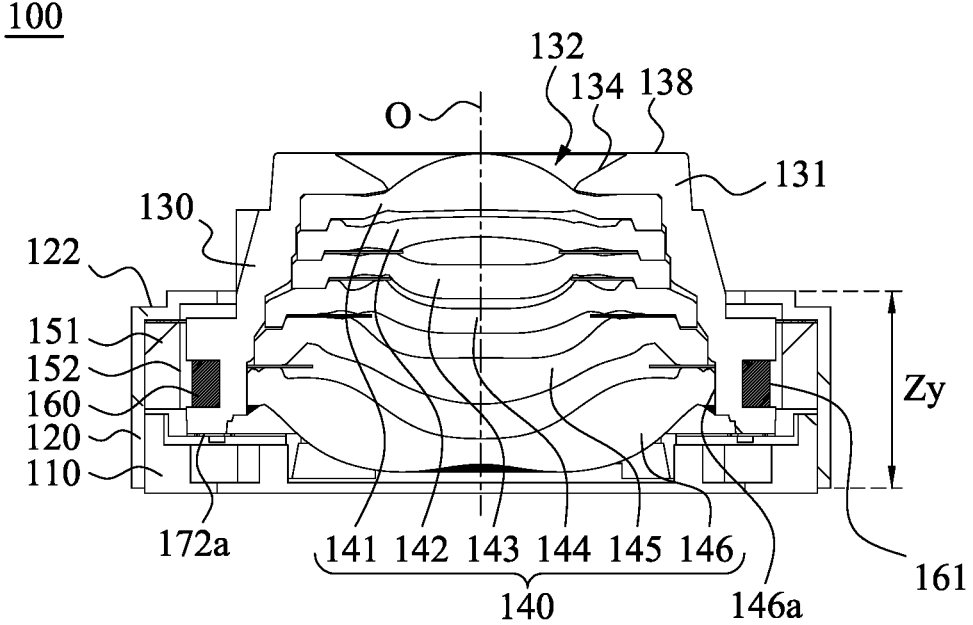
FIG. 1H is a cross-sectional view taken along line 1H-1H of the lens assembly driving apparatus in FIG. 1E.

Please refer to FIGS. 1A to 1G. FIG. 1A is a three-dimensional view of a lens assembly driving apparatus 100 according to the 1st embodiment of the present disclosure. FIG. 1B is another three-dimensional view of the lens assembly driving apparatus 100 in FIG. 1A. FIG. 1C is an exploded view of the lens assembly driving apparatus 100 in FIG. 1A. FIG. 1D is another exploded view of the lens assembly driving apparatus 100 in FIG. 1A. FIG. 1E is a top view of the lens assembly driving apparatus 100 in FIG. 1A. FIG. 1F is a side view of the lens assembly driving apparatus 100 in FIG. 1A. FIG. 1G is a bottom view of the lens assembly driving apparatus 100 in FIG. 1A. As shown in FIGS. 1A to 1G, the lens assembly driving apparatus 100 includes a holder 110, a metal yoke 120, a carrier 130, a lens assembly 140 (details thereof are shown in FIG. 1H and FIG. 1K), a magnet set 150, a coil 160 and at least one elastic element (its reference numeral is omitted). Specifically, the metal yoke 120 is coupled with the holder 110 so as to form an accommodating space (its reference numeral is omitted). The accommodating space is configured to dispose the carrier 130, the lens assembly 140, the magnet set 150, the coil 160 and the elastic element. Moreover, in the present disclosure, slashes are added on the coil 160, which is for easily identifying the coil 160. The slashes are not sectional lines and have no special meanings.

In FIG. 1C, the holder 110 has an opening 111. The metal yoke 120 has a through hole 121. The carrier 130 is movably disposed in the metal yoke 120. The carrier 130 includes an object-side portion 131, and the object-side portion 131 has an object-side central hole 132.

The lens assembly 140 is coupled in the carrier 130, and a movement of the lens assembly 140 relative to the holder 110 is according to a movement of the carrier 130; in the 1st embodiment of the present disclosure, the lens assembly 140 is driven by the carrier 130 so as to move relative to the holder 110. The lens assembly 140 has an optical axis O (shown in FIG. 1H). The optical axis O is corresponding to the object-side central hole 132, which refers that the optical axis O and the object-side central hole 132 are corresponding to each other in function. Specifically, the correspondence in function between the optical axis O and the object-side central hole 132 allows light to enter into the lens assembly 140 through the object-side central hole 132. For example, the optical axis O can pass through the object-side central hole 132, or the object-side central hole 132 and the optical axis O can be coaxial.

The magnet set 150 includes a plurality of magnets 151. The magnets 151 are corresponding to each other and are fixed inside the metal yoke 120. Each of the magnets 151 includes a concave arc structure 152. With the magnet set 150 including the plurality of magnets 151, drawbacks of uneven distribution of magnetic flux and unstable assembling position caused by adopting a single annular magnet can be prevented. Moreover, with the magnet 151 including the concave arc structure 152, a larger cover range for the coil 160 can be provided thereby, so that the need for denser magnetic flux can be satisfied, which is favorable for reducing the required number of the magnets 151. Moreover, the winding number of the coil 160 can be reduced so as to achieve volume reduction and low power consumption. In the 1st embodiment, the magnet set 150 includes only two magnets 151, and the two magnets 151 are opposite to each other. However, the present disclosure is not limited thereto.

The coil 160 surrounds the carrier 130, and the coil 160 is fixed at an exterior of the carrier 130 (shown in FIG. 1H). The coil 160 is corresponding to the two magnets 151.

In the 1st embodiment, the elastic element includes a first elastic member 171 and a second elastic member 172, wherein the second elastic member 172 is coupled with the carrier 130 and the holder 110, respectively. In the 1st embodiment, the elastic element includes two elastic members (i.e., the first elastic member 171 and the second elastic member 172). However, the present disclosure is not limited thereto. The elastic element is for providing the degree of freedom and the restoring force required by the movement of the carrier 130. Accordingly, any elastic elements which can provide the aforementioned functions can be employed in the present disclosure.

Specifically, in a focusing process, an electronic signal is firstly obtained by the lens assembly driving apparatus 100 according to light of an imaged object (not shown) entering into the lens assembly 140. The electronic signal is then sent to an electronic driver (not shown), and the electronic driver provides a current to the coil 160. With an electromagnetic force generated by the interaction of the magnet set 150 and the coil 160, the carrier 130 is driven to bring the lens assembly 140 to move along the optical axis O, so that the autofocus functionality of the lens assembly 140 can be achieved. In the above focusing process, when the lens assembly 140 is driven by the carrier 130, a degree of freedom of the carrier 130 and the lens assembly 140 along the optical axis O can be provided by the first elastic member 171 and the second elastic member 172. The first elastic member 171 and the second elastic member 172 are deformed along with the movement of the carrier 130, and provide a restoring force to the carrier 130 when the carrier 130 moves back to an initial position thereof.

With the aforementioned structure, it is favorable for enhancing the evenness of magnetic flux distribution and assembling precision and reducing the volume of the lens assembly driving apparatus 100, which is favorable for the application in compact electronic devices.

Details of the lens assembly driving apparatus 100 according to the 1st embodiment are provided hereinafter.

In FIG. 1C, the holder 110 can selectively include a plurality of terminals 112, which is for electrically connecting with a circuit board (not shown). The number and the position of the terminals 112 can be adjusted according to practical needs, and the present disclosure is not limited thereto.

In FIG. 1C, a side wall (its reference numeral is omitted) of the metal yoke 120 can include at least one plane structure 123 and at least one convex curved structure 124. When a total number of the plane structure 123 and the convex curved structure 124 is N, the following condition can be satisfied: $3<N<7$. Therefore, the structure of the side wall of the metal yoke 120 can be simplified, and the number of the structures included by the side wall of the metal yoke 120 can also be simplified, which is favorable for maintaining a preferable manufacturability when a compact volume is provided. Specifically, when a number of the plane structure 123 of the metal yoke 120 is N1, and a number of the convex curved structure 124 of the metal yoke 120 is N2, the following condition can be satisfied: $N=N1+N2$. According to the 1st embodiment, the number of the plane structures 123 of the metal yoke 120 is two (N1=2), the number of the convex curved structures 124 of the metal yoke 120 is two (N2=2), so that a total number of the plane structures 123 and the convex curved structures 124 is four (N=4). However, the present disclosure is not limited thereto. In other embodiment, for example, the metal yoke can have a single convex curved structure (N1=0, N2=1, N=1). For another example, the number of the plane structures of the metal yoke is three, and the number of the convex curved structure of the metal yoke is three (N1=3, N2=3, N=6).

In FIG. 1C, the metal yoke 120 can be a ferromagnetic metal yoke. Therefore, the two magnets 151 can be adsorbed to the metal yoke 120 directly, which is favorable for enhancing the assembling precision.

In FIG. 1C and FIG. 1E, the metal yoke 120 close to the through hole 121 can be disposed with arc step portions 122, and a number of the arc step portions 122 can be corresponding to the number of the magnets 151. According to the 1st embodiment, the number of the magnets 151 is only two, thus the number of the arc step portions 122 is also only two. Moreover, the two arc step portions 122 are corresponding to the two concave arc structures 152 of the two magnets 151, respectively. Therefore, it is favorable for adjusting the fit degree between the two magnets 151 and the coil 160 so as to enhance the efficiency of electromagnetic interaction, and the use of extra adjusting components can be reduced. Furthermore, as shown in FIG. 1E, for emphasizing the corresponding relationship between the two magnets 151 and the arc step portions 122, the two magnets 151 covered by the metal yoke 120 is depicted with dash line.

Figure 1I:
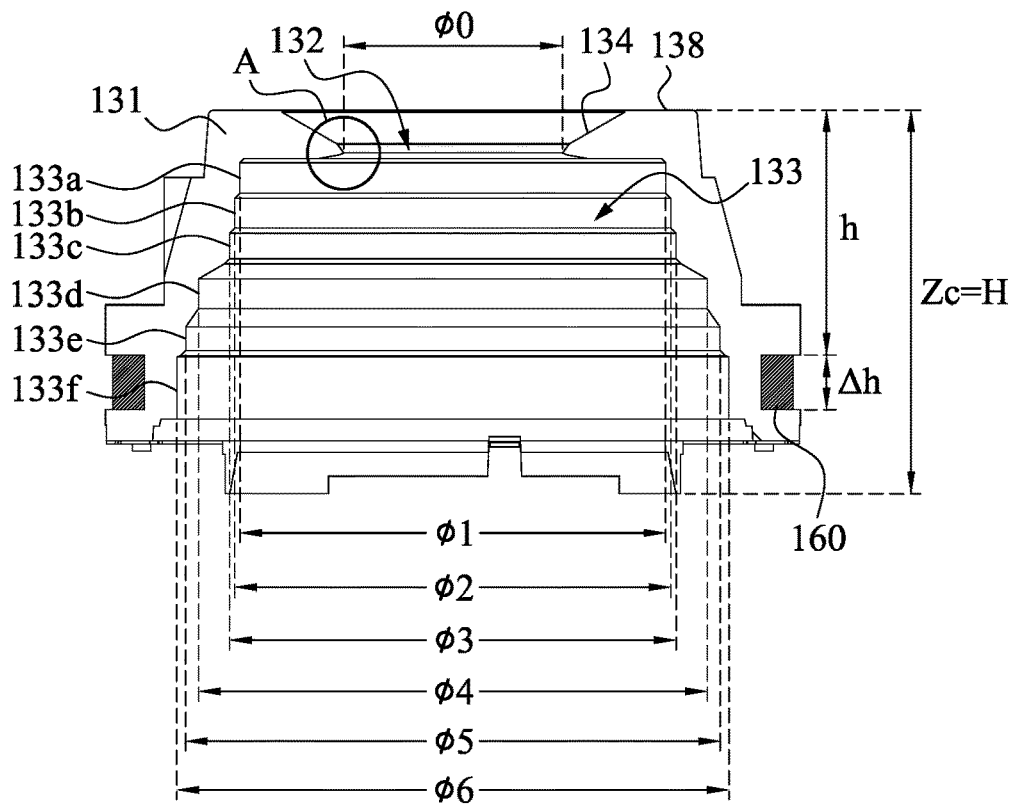
FIG. 1I is a cross-sectional view of a carrier and a coil in FIG. 1H in a combination state.
Figure 1J:
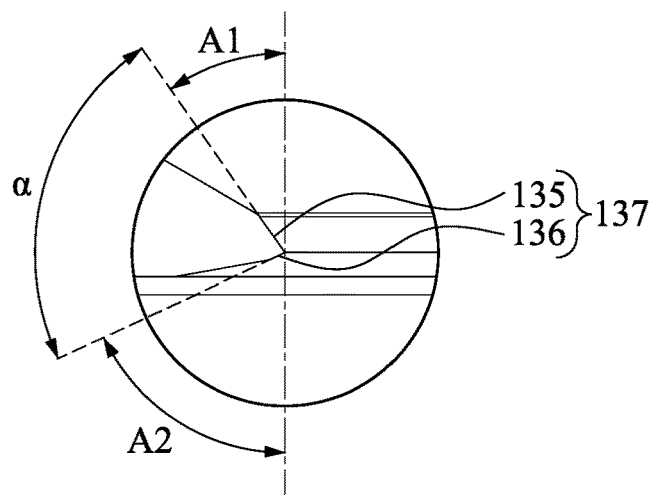
FIG. 1J is an enlarged view of a portion A shown in FIG. 1I.
Figure 1K:
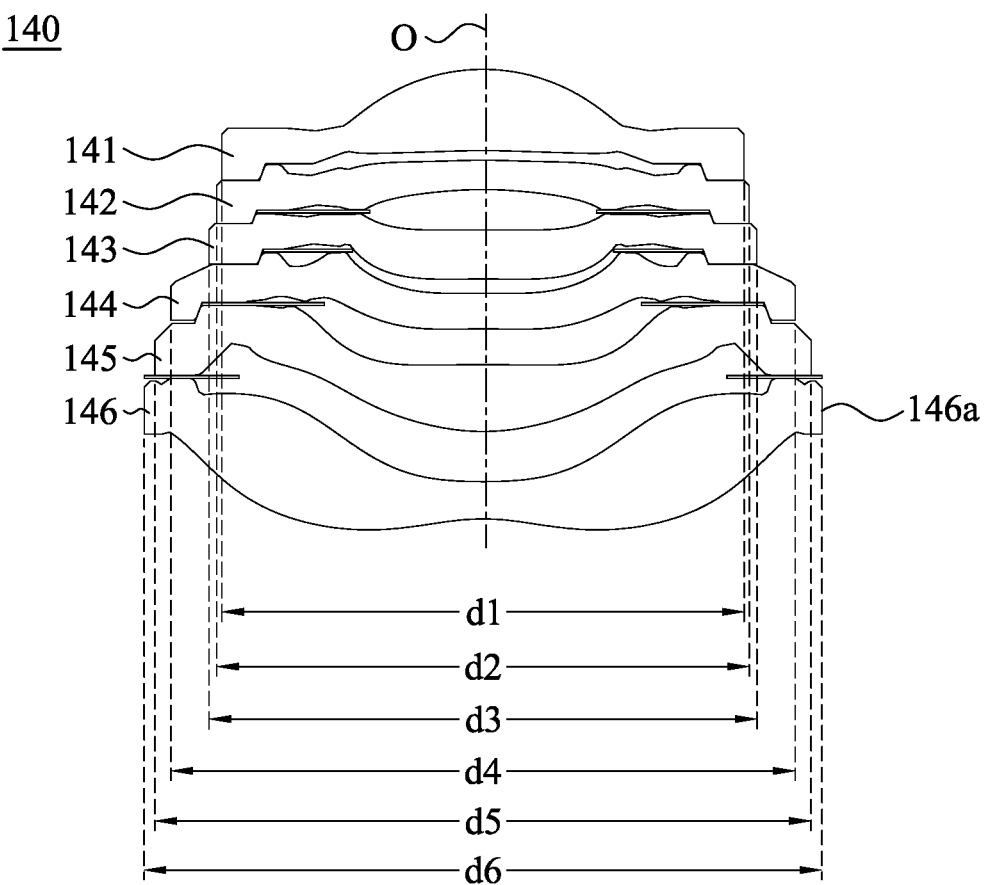
FIG. 1K is a cross-sectional view of a lens assembly shown in FIG. 1H.
Figure 1L:
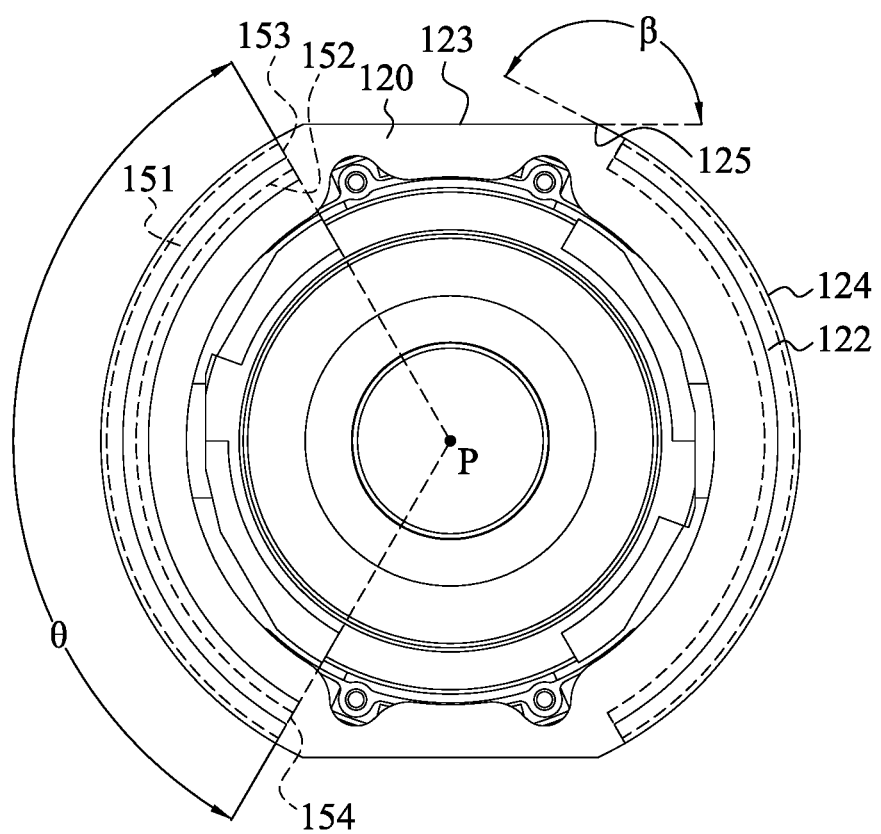
FIG. 1L is a schematic view showing parameters θ and β of the lens assembly driving apparatus in FIG. 1A.

Please refer to FIG. 1L, which is a schematic view showing parameters θ and β of the lens assembly driving apparatus 100 in FIG. 1A. The side wall (its reference numeral is omitted) of the metal yoke 120 can include at least one plane structure 123 and at least one convex curved structure 124. The plane structure 123 and the convex curved structure 124 can be configured to form at least four corners 125. When an included angle of each of the corners 125 is β, the following condition can be satisfied: 95 degrees<β<175 degrees. Therefore, the included angle of each of the corners 125 is an obtuse angle, which can further reduce the volume of the lens assembly driving apparatus 100 when the volume of lens assembly driving apparatus 100 is preliminarily reduced, the manufacturability can be maintained, and a desired yield rate of mass production can be satisfied. Furthermore, when the included angle of each of the corners 125 is an obtuse angle, it is favorable for reducing the design difficulty of the holder 110 which is corresponding to the metal yoke 120. Therefore, the condition range of injection molding of the holder 110 can be widened, which is favorable for the manufacture of the holder 110. According to the 1st embodiment, the plane structures 123 and the convex curved structures 124 are configured to form four corners 125. However, the present disclosure is not limited thereto. In other embodiments, the number of the corners formed by the plane structures and the convex curved structures can be greater than four.

Please refer to FIG. 1H and FIG. 1I, wherein FIG. 1H is a cross-sectional view taken along line 1H-1H of the lens assembly driving apparatus 100 in FIG. 1E, and FIG. 1I is a cross-sectional view of the carrier 130 and the coil 160 in FIG. 1H in a combination state. The carrier 130 can include at least three inner surfaces (133a-133f). Each of the inner surfaces has a diameter (φ1-φ6). The diameters of the inner surfaces are different from each other, and each of the diameters of the inner surfaces is greater than a diameter φ0 of the object-side central hole 132. According to the 1st embodiment, the carrier 130 includes six inner surfaces, which are an inner surface 133a, an inner surface 133b, an inner surface 133c, an inner surface 133d, an inner surface 133e and an inner surface 133f, respectively. A diameter of the inner surface 133a is φ1. A diameter of the inner surface 133b is φ2. A diameter of the inner surface 133c is φ3. A diameter of the inner surface 133d is φ4. A diameter of the inner surface 133e is φ5. A diameter of the inner surface 133f is φ6. The diameter of the object-side central hole 132 is φ0. As shown in FIG. 1I, the diameters φ1-φ6 of the six inner surfaces 133a-133f are different from each other and are all greater than the diameter φ0 of the object-side central hole 132. Moreover, as shown in FIG. 1H and FIG. 1I, the object-side central hole 132 and the inner surfaces 133a-133f of the carrier 130 are configured to form a barrel structure (its reference numeral is omitted), and an internal space 133 is defined by the inner surfaces 133a-133f for directly accommodating the lens assembly 140. Comparing to the conventional driving apparatus with the carrier and the barrel being two independent structures, the carrier 130 according to the present disclosure can be configured to form a one-piece carrier for directly accommodating the lens assembly 140, which can reduce the volume of the lens assembly driving apparatus 100 effectively. Furthermore, due to the omission of extra barrel, problems, such as the tolerance and dust, caused by assembling the carrier and the barrel can be prevented. Also, the production efficiency can be enhanced, and the material cost of injection molding can be reduced. Moreover, the number of the inner surfaces (133a-133f) in the 1st embodiment is only exemplary, and the present disclosure is not limited thereto. The number of the inner surfaces can be adjusted according to the number of the lens elements of the lens assembly 140.

In FIG. 1H, a portion of the carrier 130 surrounded by the coil 160 can be disposed inside the metal yoke 120, and the object-side portion 131 of the carrier 130 can be exposed to an outside of the metal yoke 120. Specifically, when assembling the carrier 130, the object-side portion 131 of the carrier 130 is passed through the through hole 121 from an inside of the metal yoke 120, so that the object-side portion 131 is exposed to the outside of the metal yoke 120 when the assembling is finished. Therefore, it is favorable for reducing the height of the metal yoke 120, and the distance between the metal yoke 120 and the magnets 151 can be shortened. Accordingly, the relative positions between the magnets 151 and the elastic element and fixed methods thereof can be adjusted without adding other components, which can reduce the volume of the lens assembly driving apparatus 100 effectively.

Please refer to FIG. 1I and FIG. 1J. FIG. 1J is an enlarged view of a portion A shown in FIG. 1I. The object-side portion 131 of the carrier 130 can include an annular side wall 134. The annular side wall 134 surrounds the object-side central hole 132. The annular side wall 134 can include a tip end structure 137 formed by an inclined plane 135 and an inclined plane 136. When an included angle between the inclined plane 135 and the optical axis O is A1, A1 is greater than 0 degrees and less than 90 degrees. When an included angle between the inclined plane 136 and the optical axis O is A2, A2 is greater than 0 degrees and less than 90 degrees. Therefore, surface inflections can be reduced by the tip end structure 137, and the generation of stray light can be prevented. Accordingly, a higher optical image quality can be maintained. When an included angle of the tip end structure 137 is α, the following condition can be satisfied: 35 degrees<α<145 degrees. Therefore, the manufacturing efficiency of injection molding can be maintained, the yield rate of production can be enhanced, and the waste product can be reduced. Preferably, the following condition can be satisfied: 55 degrees<α<115 degrees.

In FIG. 1H and FIG. 1I, when a height of the metal yoke 120 is Zy, and a height of the carrier 130 is Zc, the following condition can be satisfied: 1.40<Zc/Zy<1.80. Therefore, the height of the metal yoke 120 can be further reduced, and a better reduction range of volume can be obtained without magnetic leakage.

Please refer to FIG. 1H and FIG. 1K. FIG. 1K is a cross-sectional view of the lens assembly 140 shown in FIG. 1H. The lens assembly 140 can include at least three lens elements (141-146). Each of the lens elements (141-146) has an outer diameter (d1-d6). The outer diameters of the least three lens elements can be different from each other. According to the 1st embodiment, the number of the lens elements of the lens assembly 140 is six, in order from an object side (its reference numeral is omitted) to an image side (its reference numeral is omitted), the six lens elements are a lens element 141, a lens element 142, a lens element 143, a lens element 144, a lens element 145 and a lens element 146. An outer diameter of the lens element 141 is d1. An outer diameter of the lens element 142 is d2. An outer diameter of the lens element 143 is d3. An outer diameter of the lens element 144 is d4. An outer diameter of the lens element 145 is d5. An outer diameter of the lens element 146 is d6. Specifically, the outer diameters d1-d6 of the lens elements 141-146 can be corresponding to the diameters φ1-φ6 of the inner surfaces 133a-133f, which is favorable for directly accommodating the lens assembly 140 in the carrier 130. Moreover, the number and the structure of the lens elements 141-146 in the 1st embodiment are only exemplary, and the present disclosure is not limited thereto. In other embodiments, the number and the structure of the lens elements of the lens assembly can be adjusted according to the desired optical functionalities.

In FIG. 1L, for emphasizing the corresponding relationship between the two magnets 151 and the arc step portions 122 and for explaining the definition of θ, the two magnets 151 covered by the metal yoke 120 is depicted with dash line. The concave arc structure 152 of each of the two magnets 151 has a concave arc center P. In each of the two magnets 151, when an included angle between two connecting lines of two ends 153, 154 of the concave arc structure 152 and the concave arc center P is θ, and the magnet set 150 only includes the two magnets 151, the following condition can be satisfied: 95 degrees<θ<175 degrees. Therefore, the efficiency of the electromagnetic interaction between the magnet set 150 and the coil 160 can be enhanced, the winding number of the coil 160 can be reduced, so that the effect of reducing volume and power consumption can be improved. Moreover, the drawback of the dispersion of magnetic flux caused by too many magnets 151 can be prevented. In the 1st embodiment, the concave arc structure 152 is a concave structure with a circular arc shape, in this case, the concave arc center P is a center of the curvature radius of the concave arc structure 152. In other embodiment, the concave arc structure can be a concave structure including a plurality of sides (shown in FIG. 3), in this case, the concave arc center P is a center of the circumcircle of a polygon corresponding to the concave arc structure 152.

In FIG. 1C, the coil 160 can have a convex arc structure 161, and the convex arc structure 161 of the coil 160 can be corresponding to the concave arc structure 152 of each of the two magnets 151. In FIG. 1H, there can be an overlap between the convex arc structure 161 of the coil 160 and an outer diameter surface 146a of the lens element 146 of the lens assembly 140 which is closest to an image side along a direction perpendicular to the optical axis O. Therefore, the coil 160 can be maintained at a position close to the image side, which is favorable for maintaining a larger surface area of the coil 160 with a reduced object-side volume of the carrier 130, and the lens assembly 140 can be stabilized by the electromagnetic force between the magnet set 150 and the coil 160.

In FIG. 1I, the object-side portion 131 of the carrier 130 can further include an object-side outer surface 138. The object-side outer surface 138 is disposed at an end of the carrier 130 away from the holder 110. In the 1st embodiment, the object-side outer surface 138 is disposed at a most object-side end of the carrier 130 and is disposed at a plane (its reference numeral is omitted) perpendicular to the optical axis O. However, the present disclosure is not limited thereto. For example, the object-side outer surface 138 can be disposed at an inclined plane (not shown), wherein an included angle between the inclined plane and the optical axis O is not equal to 90 degrees, and the object-side outer surface 138 can be disposed at other position of the carrier 130 other than the most object-side end thereof. When a distance parallel to the optical axis O between the coil 160 and the object-side outer surface 138 is h, and a maximum height of the carrier 130 measured from the object-side outer surface 138 is H, the following condition can be satisfied: 0.5<h/H<0.95. Therefore, the position of the coil 160 is proper, which is favorable for controlling the tilt degree between the carrier 130 and holder 110 within a desired range. Furthermore, in the 1st embodiment, because the object-side outer surface 138 is disposed on the most object-side end of the carrier 130, the height Zc of the carrier 130 is equal to the maximum height H of the carrier 130 measured from the object-side outer surface 138. However, the present disclosure is not limited thereto. For example, when the object-side outer surface 138 is not disposed on the most object-side end of the carrier 130, the height Zc of the carrier 130 is greater than the maximum height H of the carrier 130 measured from the object-side outer surface 138.

In FIG. 1I, when a length of the coil 160 parallel to the optical axis O is $\Delta h$, and the maximum height of the carrier 130 measured from the object-side outer surface 138 is H, the following condition can be satisfied: $0.05 < \Delta h/H < 0.35$. Therefore, when the magnet 151 has a maximum radian, the volume of the coil 160 can be further reduced under an optimized efficiency of the electromagnetic interaction, and the power consumption can be reduced.

In FIG. 10, the elastic element (its reference numeral is omitted) includes the first elastic member 171 and the second elastic member 172. The first elastic member 171 is coupled with a portion of the carrier 130 close to the through hole 121 of the metal yoke 120 (that is, the first elastic member 171 is coupled with a portion of the carrier 130 away from the holder 110). The second elastic member 172 is coupled with a portion of the carrier 130 close to the holder 110. With the elasticity of the first elastic member 171 and the second elastic member 172, the carrier 130 can be supported on the holder 110. Moreover, with the upper and lower assembly of the first elastic member 171 and the second elastic member 172, the tilt of the lens assembly 140 can be prevented. Furthermore, the second elastic member 172 can include two springs 172a. The two springs 172a are electrically separated with each other, and the two springs 172a are arranged on a same horizontal plane. Therefore, the two springs 172a can be employed as conducting medium for sending the current drive signal required by the coil 160.

Moreover, the lens assembly driving apparatus 100 can be a non-threaded driving apparatus. The non-threaded driving apparatus can refer that the carrier 130 can directly accommodating the lens assembly 140 or can refer that the fixation between the carrier 130 and the lens assembly 140 with no need for threaded structures. Preferably, the non-threaded driving apparatus can refer that the entirety of the lens assembly driving apparatus 100 with no need for threaded structures for the fixation of the internal components thereof. Therefore, the number of the components can be reduced and the assembling efficiency can be enhanced significantly. Moreover, with the non-threaded design, the unmatched torques and the dust caused by rubbing when assembling the conventional barrel and carrier can be avoided, and the volume can be reduced, too.

In the 1st embodiment, values of parameters N1, N2, N, β, φ0, φ1, φ2, φ3, φ4, φ5, φ6, A1, A2, α, Zy, Zc, Zc/Zy, d1, d2, d3, d4, d5, d6, θ, h, H, h/H, Δh, Δh/H are listed in Table 1.

TABLE 1

| N1 | 2 | Zc [mm] | 3.7 |
|---|---|---|---|
| N2 | 2 | Zc/Zy | 1.65 |
| N | 4 | d1 [mm] | 4.1 |
| β [deg.] | 153 | d2 [mm] | 4.2 |
| φ0 [mm] | 2.11 | d3 [mm] | 4.3 |
| φ1 [mm] | 4.1 | d4 [mm] | 4.9 |
| φ2 [mm] | 4.2 | d5 [mm] | 5.15 |

TABLE 1-continued

| φ3 [mm] | 4.3 | d6 [mm] | 5.32 |
|---|---|---|---|
| φ4 [mm] | 4.9 | θ [deg.] | 120 |
| φ5 [mm] | 5.15 | h [mm] | 2.36 |
| φ6 [mm] | 5.32 | H [mm] | 3.7 |
| A1 [deg.] | 35 | h/H | 0.64 |
| A2 [deg.] | 65 | Δh [mm] | 0.53 |
| α [deg.] | 80 | Δh/H | 0.14 |
| Zy [mm] | 2.24 | | |

2nd Embodiment

Figure 2:
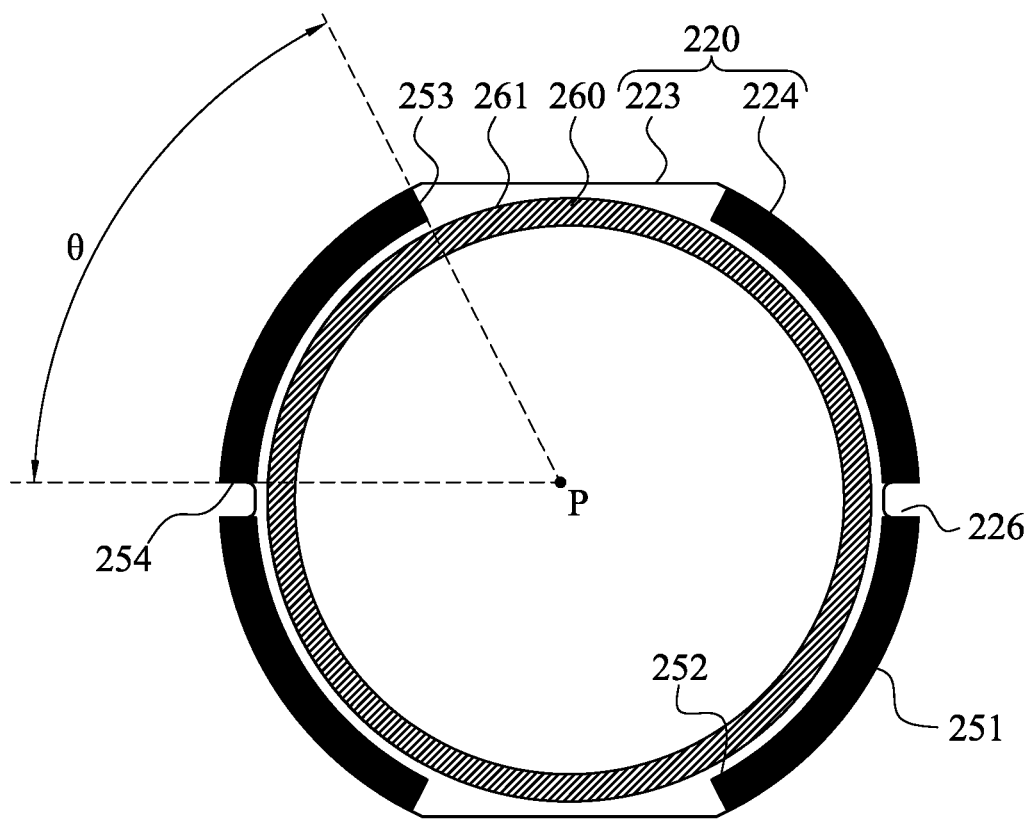
FIG. 2 is a schematic view showing a metal yoke, a magnet set and a coil of a lens assembly driving apparatus according to the 2nd embodiment of the present disclosure in a combination state.

Please refer to FIG. 2, which is a schematic view showing a metal yoke 220, a magnet set (its reference numeral is omitted) and a coil 260 of a lens assembly driving apparatus (its reference numeral is omitted) according to the 2nd embodiment of the present disclosure in a combination state. The view angle of FIG. 2 is from top to bottom. Moreover, FIG. 2 is for emphasizing the corresponding relationship between the metal yoke 220, the magnet set and the coil 260, so that other details of the lens assembly driving apparatus of the 2nd embodiment are omitted. When no contradictions occur, other details of the lens assembly driving apparatus of the 2nd embodiment can be identical to that of the lens assembly driving apparatus 100 of the 1st embodiment, and are not described herein.

In the 2nd embodiment, a side wall (its reference numeral is omitted) of the metal yoke 220 includes plane structures 223 and convex curved structures 224. When a number of the plane structures 223 of the metal yoke 220 is N1, a number of the convex curved structures 224 of the metal yoke 220 is N2, and a total number of the plane structures 223 and the convex curved structures 224 is N, the following conditions can be satisfied: N1=2, N2=4, and N=6. Moreover, two neighboring convex curved structures 224 can be separated by a concave groove 226 formed on the metal yoke 220. How to process the metal yoke 220 so as to form the concave groove 226 is well known in the art, which is not recited herein.

In the 2nd embodiment, the magnet set includes four magnets 251. The four magnets 251 are corresponding to each other and are fixed inside the metal yoke 220. Each of the four magnets 251 includes a concave arc structure 252. The concave arc structure 252 of each of the four magnets 251 has a concave arc center P. In each of the four magnets 251, when an included angle between two connecting lines of two ends 253, 254 of the concave arc structure 252 and the concave arc center P is θ, the following condition is satisfied: θ=63.07 degrees.

In the 2nd embodiment, the coil 260 is formed in an annular shape, and the coil 260 has a convex arc structure 261. The convex arc structure 261 of the coil 260 is corresponding to the concave arc structure 252 of each of the four magnets 251.

Moreover, slashes are added in the four magnets 251 and the coil 260 in FIG. 2, which is for easily identifying the four magnets 251 and the coil 260. The slashes are not sectional lines and have no special meanings.

3rd Embodiment

Figure 3:
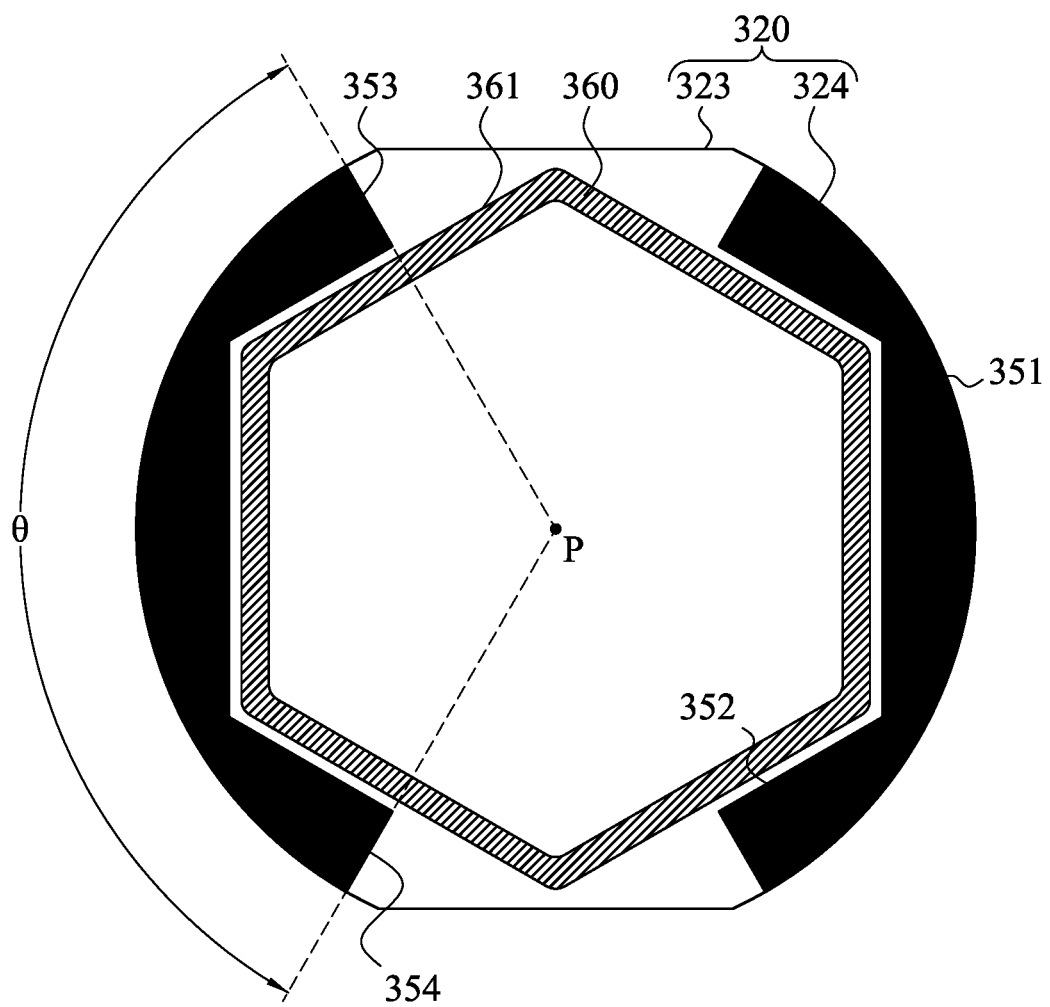
FIG. 3 is a schematic view showing a metal yoke, a magnet set and a coil of a lens assembly driving apparatus according to the 3rd embodiment of the present disclosure in a combination state.

Please refer to FIG. 3, which is a schematic view showing a metal yoke 320, a magnet set (its reference numeral is omitted) and a coil 360 of a lens assembly driving apparatus (its reference numeral is omitted) according to the 3rd embodiment of the present disclosure in a combination state.

The view angle of FIG. 3 is from top to bottom. Moreover, FIG. 3 is for emphasizing the corresponding relationship between the metal yoke 320, the magnet set and the coil 360, so that other details of the lens assembly driving apparatus of the 3rd embodiment are omitted. When no contradictions occur, other details of the lens assembly driving apparatus of the 3rd embodiment can be identical to that of the lens assembly driving apparatus 100 of the 1st embodiment, and are not described herein.

In the 3rd embodiment, a side wall (its reference numeral is omitted) of the metal yoke 320 includes plane structures 323 and convex curved structures 324. When a number of the plane structures 323 of the metal yoke 320 is N1, a number of the convex curved structures 324 of the metal yoke 320 is N2, and a total number of the plane structures 323 and the convex curved structures 324 is N, the following conditions can be satisfied: N1=2, N2=2, and N=4.

In the 3rd embodiment, the magnet set includes two magnets 351. The two magnets 351 are opposite to each other and are fixed inside the metal yoke 320. Each of the two magnets 351 includes a concave arc structure 352. The concave arc structure 352 of each of the two magnets 351 has a concave arc center P. In each of the two magnets 351, when an included angle between two connecting lines of two ends 353, 354 of the concave arc structure 352 and the concave arc center P is θ, the following condition is satisfied: θ=120 degrees. In the 3rd embodiment, the concave arc structure 352 can be a concave structure including a plurality of sides, in this case, the concave arc center P is a center of the circumcircle of a polygon corresponding to the concave arc structure 352. Specifically, the concave arc structure 352 is a portion of a hexagon (not shown), and the concave arc center P is a center of the circumcircle (not shown) of the hexagon.

In the 3rd embodiment, the coil 360 is formed in a hexagon, and the coil 360 has a convex arc structure 361. The convex arc structure 361 of the coil 360 is corresponding to the concave arc structure 352 of each of the two magnets 351. Specifically, the hexagon of the coil 360 and the hexagon corresponding to the concave arc structure 352 are similar. In other words, the concave arc center P of the concave arc structure 352 can also be a center of a circumcircle of the hexagon of the coil 360.

Moreover, slashes are added in the two magnets 351 and the coil 360 in FIG. 3, which is for easily identifying the two magnets 351 and the coil 360. The slashes are not sectional lines and have no special meanings.

4th Embodiment

Figure 4A:
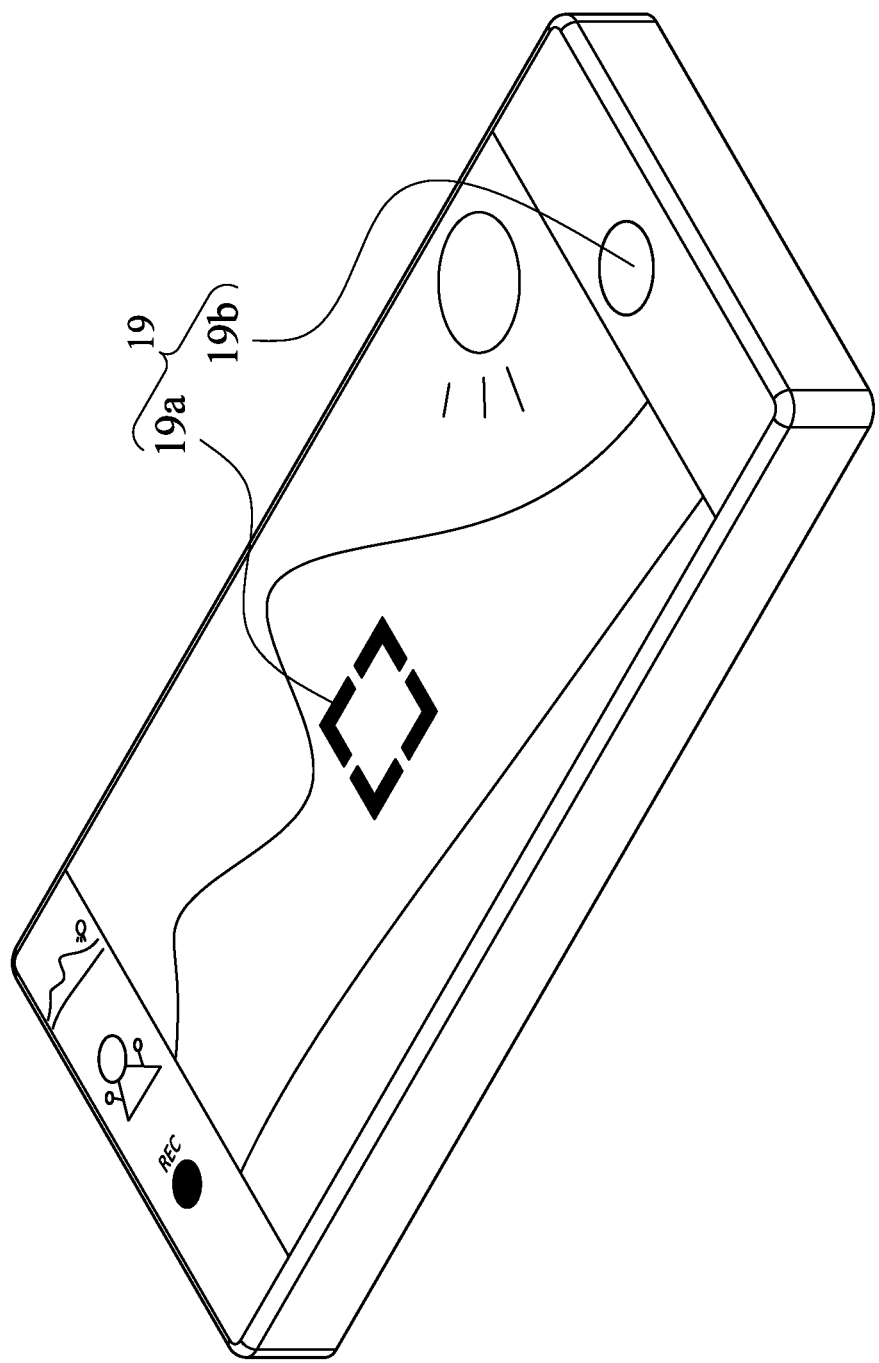
FIG. 4A is a schematic view showing an electronic device according to the 4th embodiment of the present disclosure.
Figure 4B:
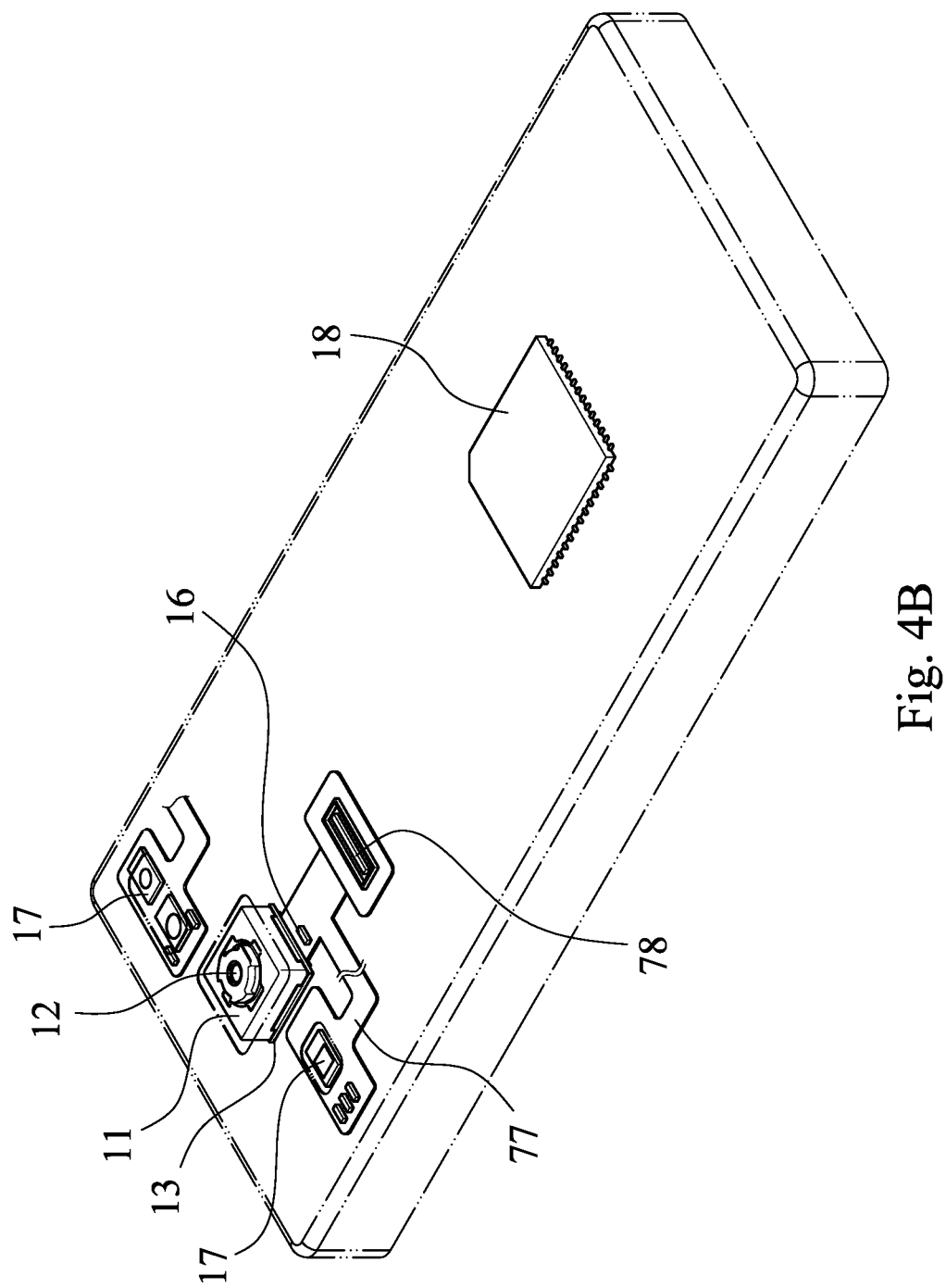
FIG. 4B is another schematic view of the electronic device in FIG. 4A.
Figure 4C:
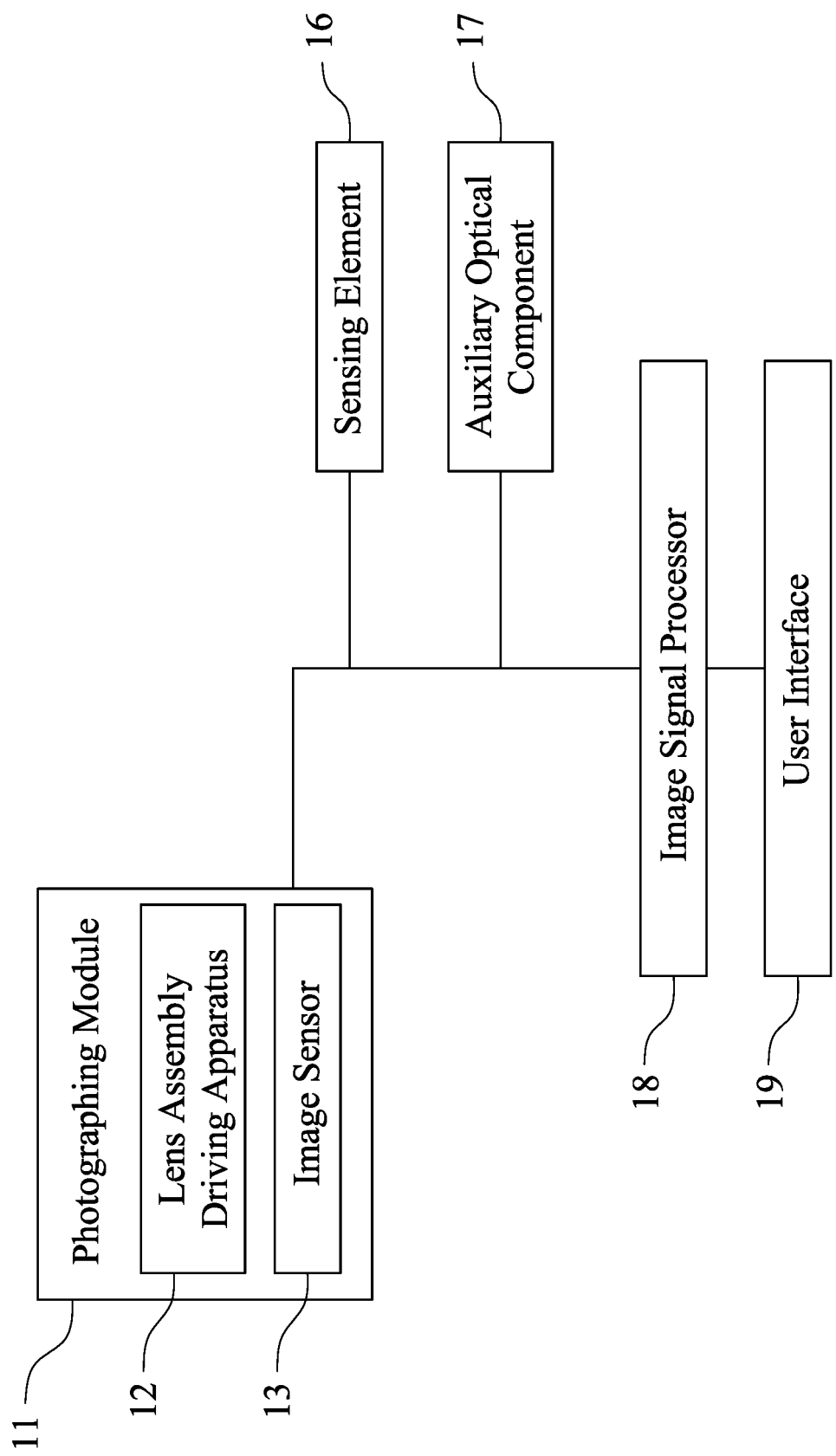
FIG. 4C is a block diagram of the electronic device in FIG. 4A.

Please refer to FIG. 4A to FIG. 4C. FIG. 4A is a schematic view showing an electronic device 10 according to the 4th embodiment of the present disclosure. FIG. 4B is another schematic view of the electronic device 10 in FIG. 4A. FIG. 4C is a block diagram of the electronic device 10 in FIG. 4A. Particularly, FIG. 4A and FIG. 4B are schematic views related to a camera of the electronic device 10, and FIG. 4C is the block diagram related to the camera of the electronic device 10. As shown in FIG. 4A and FIG. 4B, the electronic device 10 of the 4th embodiment is a smart phone, wherein the electronic device 10 includes a photographing module 11, and the photographing module 11 includes the lens assembly driving apparatus 12 according to the present disclosure and an image sensor 13. The image sensor 13 is disposed on an image surface (not shown herein) of the lens assembly (its reference numeral is omitted) of the lens assembly driving apparatus 12 for receiving an imaging light from the lens assembly. Therefore, the requirement of compactness for current electronic devices can be satisfied.

The electronic device 10 can further include at least one sensing element 16, at least one auxiliary optical component 17, an image signal processor (ISP) 18, a user interface 19, a circuit board 77 and a connector 78, wherein the user interface 19 includes a touch screen 19a and a button 19b.

Furthermore, the user activates the capturing mode via the user interface 19 (the touch screen 19a or the button 19b). At this moment, the imaging light is converged on the image sensor 13 by the lens assembly driving apparatus 12, and the electronic signal associated with image is output to the image signal processor 18.

The auxiliary optical component 17 can be a flash module for compensating color temperature, an infrared distance measurement component, a laser focus module, etc. The sensing element 16 can have functions for sensing physical momentum and kinetic energy, such as an accelerator, a gyroscope, a Hall effect element, to sense shaking or jitters applied by hands of the user or external environments. Accordingly, the functions of the lens assembly driving apparatus 12 of the photographing module 11 can be enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the autofocus function of what you see is what you get.

Furthermore, as shown in FIG. 4B, the photographing module 11, the sensing element 16 and the auxiliary optical component 17 can be disposed on the circuit board 77 (the circuit board 77 is a flexible printed circuit board, FPC) and electrically connected with the associated components, such as the imaging signal processor 18, via the connector 78 to perform a capturing process. Since current electronic devices, such as smart phones, have a tendency of being compact. In the 4th embodiment, the way of firstly disposing the photographing module 11 and related components on the flexible printed circuit board 77 and secondly integrating the circuit thereof into the main board of the electronic device 10 via the connector 78 can satisfy the mechanical design of the limited space inside the electronic device 10 and the layout requirements and obtain more margins. The autofocus function of the photographing module 11 can also be controlled more flexibly via the touch screen 19a of the electronic device 10. In other embodiments (not shown herein), the sensing element 16 and the auxiliary optical component 17 can also be disposed on the main board of the electronic device 10 or carrier boards of other types according to requirements of the mechanical design and the circuit layout.

In addition, the electronic device 10 can further include but not be limited to a wireless communication unit, a control unit, a storage unit, a random access memory (RAM), a read-only memory (ROM), or a combination thereof.

5th Embodiment

Figure 5:
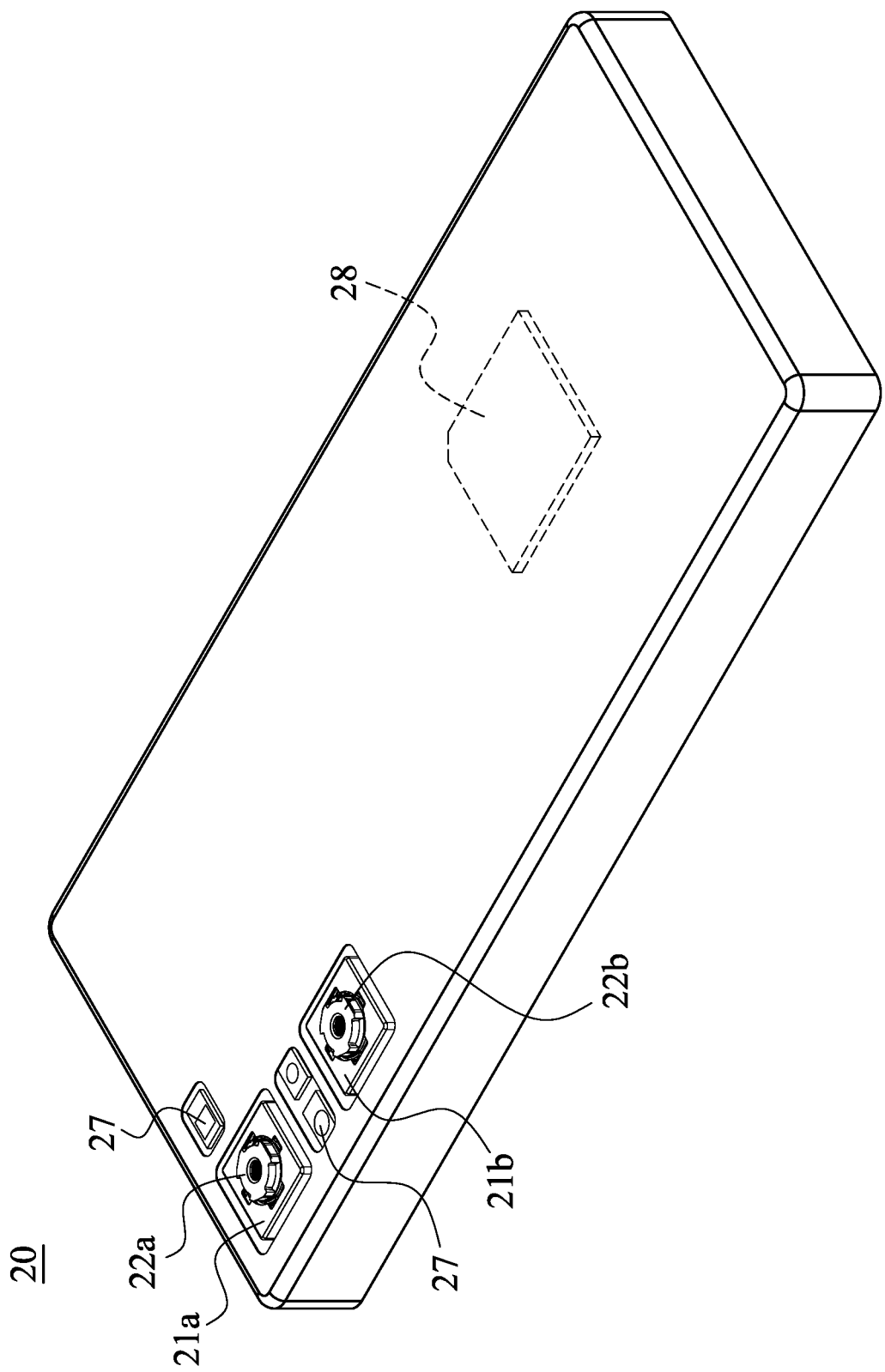
FIG. 5 is a schematic view of an electronic device according to the 5th embodiment of the present disclosure.

Please refer to FIG. 5, which is a schematic view of an electronic device 20 according to the 5th embodiment of the present disclosure. As shown in FIG. 5, the electronic device 20 of the 5th embodiment is a smart phone, wherein the electronic device 20 includes a photographing module 21a and a photographing module 21b. The photographing module 21a includes a lens assembly driving apparatus 22a and an image sensor (not shown). The image sensor is disposed on an image surface (not shown) of the lens assembly (its reference numeral is omitted) of the lens assembly driving apparatus 22a for receiving an imaging light from the lens assembly. The photographing module 21b includes a lens assembly driving apparatus 22b and an image sensor (not shown). The image sensor is disposed on an image surface (not shown) of the lens assembly (its reference numeral is omitted) of the lens assembly driving apparatus 22b for receiving an imaging light from the lens assembly.

Moreover, at least one of the lens assembly driving apparatus 22a and the lens assembly driving apparatus 22b is the lens assembly driving apparatus according to the present disclosure. The optical properties of the lens assemblies of the lens assembly driving apparatus 22a and the lens assembly driving apparatus 22b can be the same or different. During the capturing process of the electronic device 20, with the aid of the auxiliary optical component 27, two images can be obtained by the photographing module 21a and the photographing module 21b, then effects, such as a zoom effect and an exquisite effect, can be provided by the processing element (such as the imaging signal processor 28) of the electronic device 20.

Details of the auxiliary optical component 27 can refer to that of the auxiliary optical component 17 of the 4th embodiment, and are not described herein.

6th Embodiment

Figure 6:
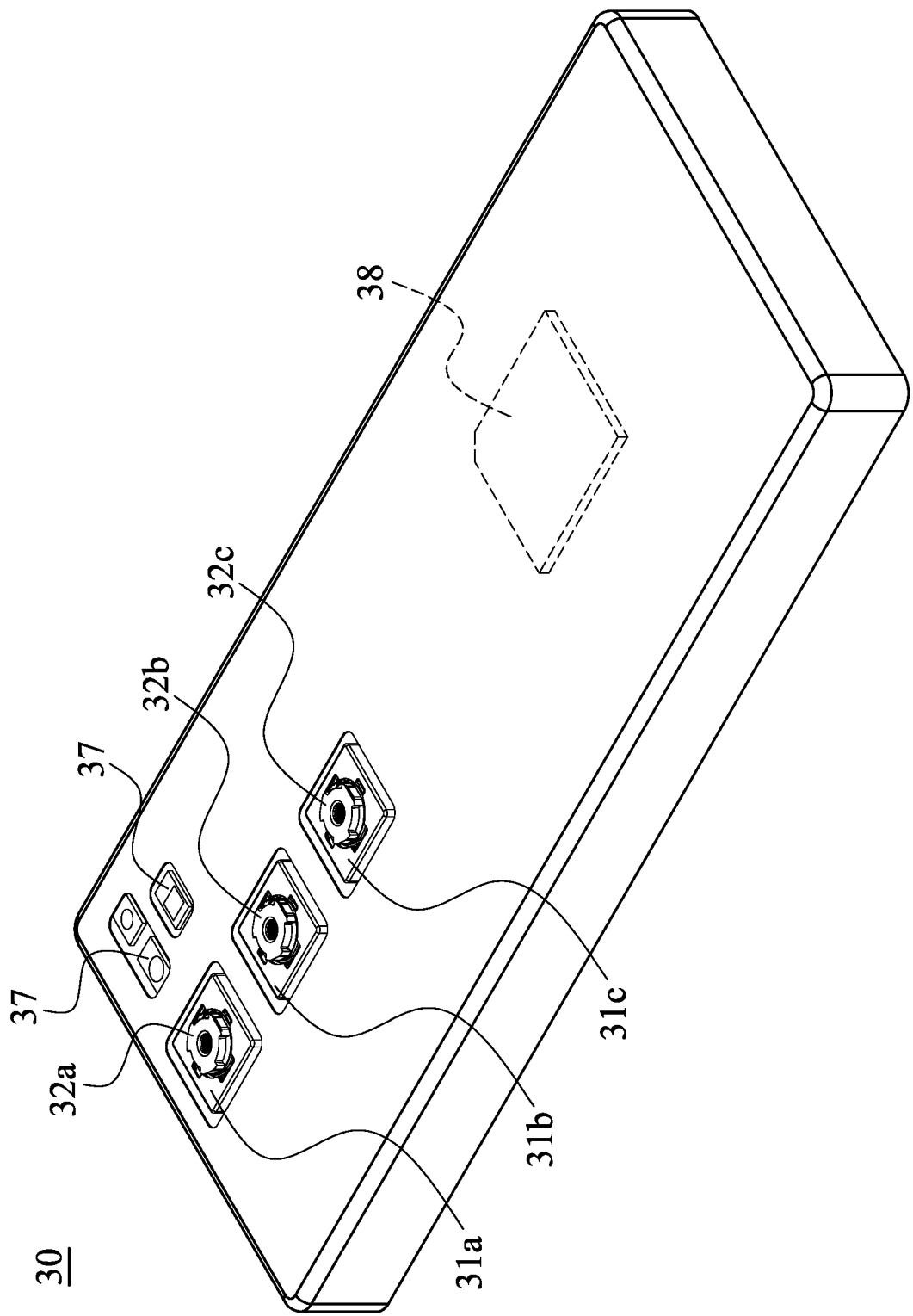
FIG. 6 is a schematic view of an electronic device according to the 6th embodiment of the present disclosure.

FIG. 6 is a schematic view of an electronic device 30 according to the 6th embodiment of the present disclosure. As shown in FIG. 6, the electronic device 30 of the 6th embodiment is a smart phone, wherein the electronic device 30 includes a photographing module 31a, a photographing module 31b and a photographing module 31c. The photographing module 31a includes a lens assembly driving apparatus 32a and an image sensor (not shown). The image sensor is disposed on an image surface (not shown herein) of the lens assembly (its reference numeral is omitted) of the lens assembly driving apparatus 32a for receiving an imaging light from the lens assembly. The photographing module 31b includes a lens assembly driving apparatus 32b and an image sensor (not shown). The image sensor is disposed on an image surface (not shown) of the lens assembly (its reference numeral is omitted) of the lens assembly driving apparatus 32b for receiving an imaging light from the lens assembly. The photographing module 31c includes a lens assembly driving apparatus 32c and an image sensor (not shown). The image sensor is disposed on an image surface (not shown herein) of the lens assembly (its reference numeral is omitted) of the lens assembly driving apparatus 32c for receiving an imaging light from the lens assembly.

Moreover, at least one of the lens assembly driving apparatus 32a, the lens assembly driving apparatus 32b and the lens assembly driving apparatus 32c is the lens assembly driving apparatus according to the present disclosure. The optical properties of the lens assemblies of the lens assembly driving apparatus 32a, the lens assembly driving apparatus 32b and the lens assembly driving apparatus 32c can be the same or different. During the capturing process of the electronic device 30, with the aid of the auxiliary optical component 37, three images can be obtained by the photographing module 31a, the photographing module 31b and the photographing module 31c, then effects, such as a zoom effect and an exquisite effect, can be provided by the processing element (such as the imaging signal processor 38) of the electronic device 30.

Details of the auxiliary optical component 37 can refer to that of the auxiliary optical component 17 of the 4th embodiment, and are not described herein.

7th Embodiment

Figure 7:
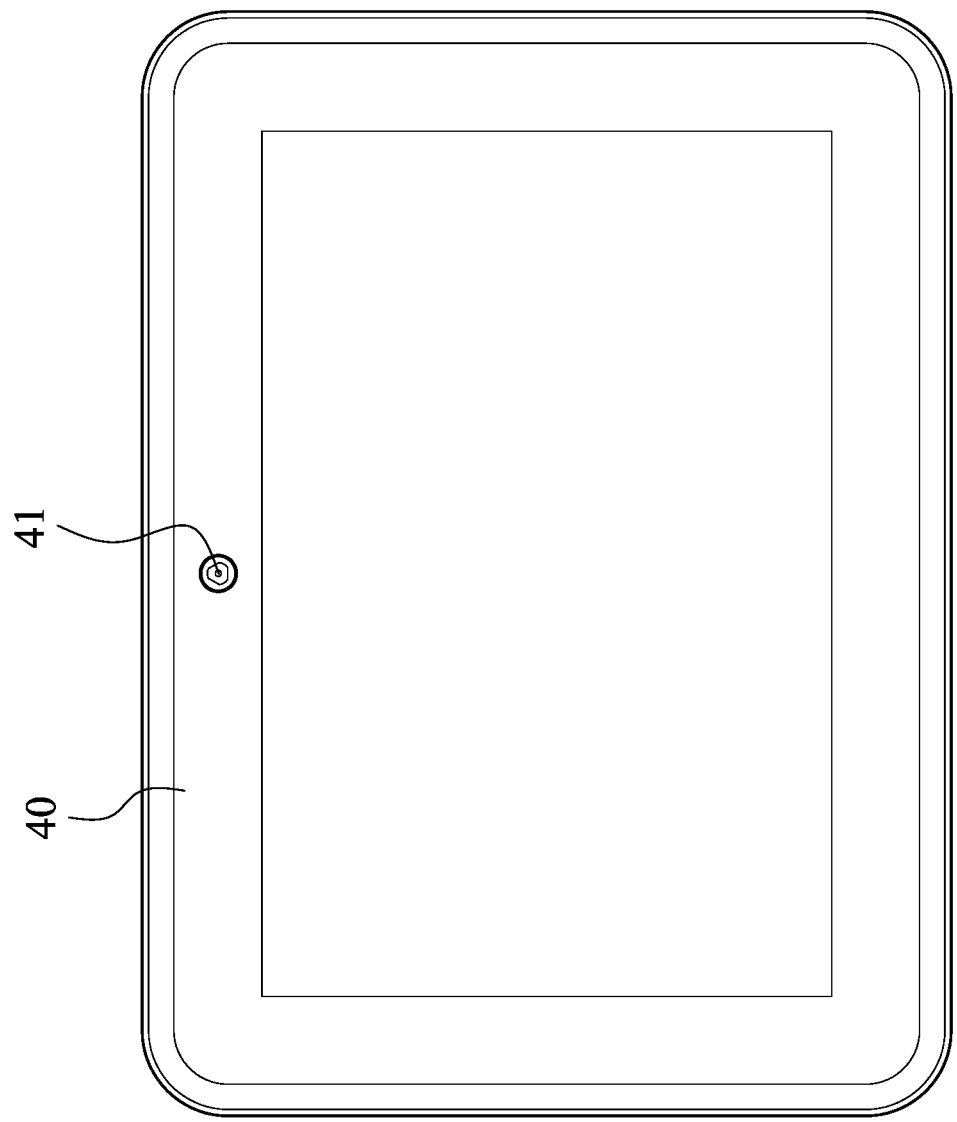
FIG. 7 is a schematic view of an electronic device according to the 7th embodiment of the present disclosure.

FIG. 7 is a schematic view of an electronic device 40 according to the 7th embodiment of the present disclosure. In FIG. 7, the electronic device 40 of the 7th embodiment is a tablet, and the electronic device 40 includes a photographing module 41. The photographing module 41 includes a lens assembly driving apparatus (its reference numeral is omitted) according to the present disclosure and an image sensor (not shown herein). The image sensor is disposed on an image surface (not shown herein) of the lens assembly of the lens assembly driving apparatus for receiving an imaging light from the lens assembly.

8th Embodiment

Figure 8:
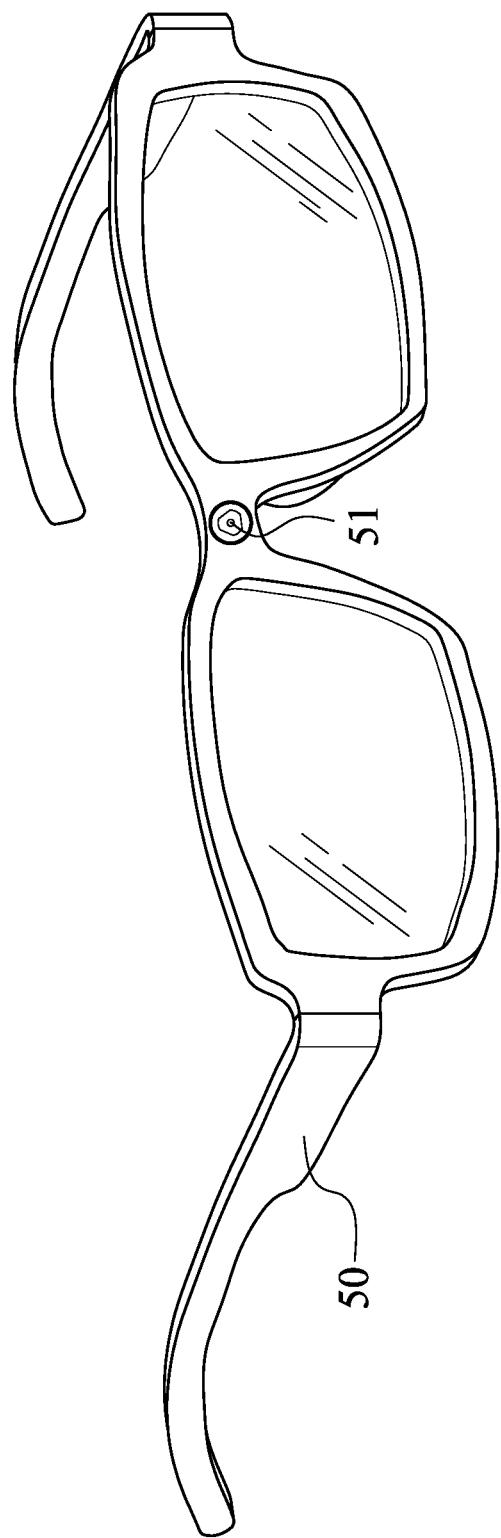
FIG. 8 is a schematic view of an electronic device according to the 8th embodiment of the present disclosure.

FIG. 8 is a schematic view of an electronic device 50 according to the 8th embodiment of the present disclosure. In FIG. 8, the electronic device 50 of the 8th embodiment is a wearable device, and the electronic device 50 includes a photographing module 51. The photographing module 51 includes a lens assembly driving apparatus (its reference numeral is omitted) according to the present disclosure and an image sensor (not shown herein). The image sensor is disposed on an image surface (not shown herein) of the lens assembly of the lens assembly driving apparatus for receiving an imaging light from the lens assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A lens assembly driving apparatus, comprising:
   a holder having an opening;
   a metal yoke coupled with the holder, wherein the metal yoke has a through hole, and a side wall of the metal yoke comprises at least one plane structure and at least one convex curved structure;
   a carrier movably disposed in the metal yoke and comprising an object-side portion, wherein the object-side portion has an object-side central hole;
   a lens assembly having an optical axis, wherein the optical axis is corresponding to the object-side central hole, the lens assembly comprises at least three lens elements, each of the lens elements has an outer diameter, the outer diameters of the lens elements are different from each other, the lens assembly is coupled in the carrier, and a movement of the lens assembly relative to the holder is according to a movement of the carrier;
   a magnet set comprising a plurality of magnets, wherein the magnets are corresponding to each other and are fixed inside the metal yoke, and each of the magnets comprises a concave arc structure;
a coil surrounding and fixed at an exterior of the carrier, wherein the coil is corresponding to the magnets; and
at least one elastic element coupled with the carrier and the holder;
wherein the lens assembly driving apparatus is a non-threaded driving apparatus, a total number of the plane structure and the convex curved structure is N, and the following condition is satisfied:

$3<N<7$.

2. The lens assembly driving apparatus of claim 1, wherein the object-side portion of the carrier comprises an annular side wall surrounding the object-side central hole, the annular side wall comprises a tip end structure formed by two inclined planes, and an included angle between each of the inclined planes and the optical axis is greater than 0 degrees and less than 90 degrees.

3. The lens assembly driving apparatus of claim 2, wherein an included angle of the tip end structure is α, and the following condition is satisfied:

35 degrees$<\alpha<$145 degrees.

4. The lens assembly driving apparatus of claim 1, wherein a portion of the carrier surrounded by the coil is disposed inside the metal yoke, and the object-side portion of the carrier is exposed to an outside of the metal yoke.

5. The lens assembly driving apparatus of claim 4, wherein a height of the metal yoke is Zy, a height of the carrier is Zc, and the following condition is satisfied:

$1.40<Zc/Zy<1.80$.

6. The lens assembly driving apparatus of claim 1, wherein the metal yoke is a ferromagnetic metal yoke, the metal yoke close to the through hole is disposed with an arc step portion, and the arc step portion is corresponding to the concave arc structure of each of the magnets.

7. The lens assembly driving apparatus of claim 1, wherein the elastic element comprises a first elastic member and a second elastic member, the first elastic member is coupled with a top portion of the carrier, and the second elastic member is coupled with a bottom portion of the carrier.

8. The lens assembly driving apparatus of claim 1, wherein the coil has a convex arc structure, the convex arc structure of the coil is corresponding to the concave arc structure of each of the magnets, and there is an overlap between the convex arc structure of the coil and an outer diameter surface of a lens element of the lens assembly which is closest to an image side along a direction perpendicular to the optical axis.

9. The lens assembly driving apparatus of claim 1, wherein the object-side portion comprises an object-side outer surface disposed at an end of the carrier away from the holder, a distance parallel to the optical axis between the coil and the object-side outer surface is h, a maximum height of the carrier measured from the object-side outer surface is H, and the following condition is satisfied:

$0.5<h/H<0.95$.

10. The lens assembly driving apparatus of claim 9, wherein a length of the coil parallel to the optical axis is Δh, the maximum height of the carrier measured from the object-side outer surface is H, and the following condition is satisfied:

$0.05<\Delta h/H<0.35$.

* * * * *